(12) United States Patent
Schwarz et al.

(10) Patent No.: US 11,428,121 B2
(45) Date of Patent: Aug. 30, 2022

(54) COOLING AIR FOR GAS TURBINE ENGINE WITH THERMALLY ISOLATED COOLING AIR DELIVERY

(71) Applicant: United Technologies Corporation, Farmington, CT (US)

(72) Inventors: Frederick M. Schwarz, Glastonbury, CT (US); Nathan Snape, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 455 days.

(21) Appl. No.: 16/375,892

(22) Filed: Apr. 5, 2019

(65) Prior Publication Data
US 2020/0141270 A1 May 7, 2020

Related U.S. Application Data

(60) Provisional application No. 62/653,647, filed on Apr. 6, 2018.

(51) Int. Cl.
*F01D 5/08* (2006.01)
*F01D 25/08* (2006.01)

(52) U.S. Cl.
CPC .......... *F01D 25/08* (2013.01); *F05D 2220/32* (2013.01); *F05D 2240/60* (2013.01); *F05D 2300/614* (2013.01)

(58) Field of Classification Search
CPC . F01D 5/046; F01D 5/08; F01D 5/147; F01D 5/18; F01D 11/18; F01D 25/08; F01D 25/145; F02C 7/24; F02C 9/18
See application file for complete search history.

(56) References Cited

U.S. PATENT DOCUMENTS

| | | | | |
|---|---|---|---|---|
| 5,783,315 A | * | 7/1998 | Schaeffer | ............... C23C 28/00 428/633 |
| 6,612,114 B1 | | 9/2003 | Klingels | |
| 7,288,328 B2 | * | 10/2007 | Darolia | .................. F01D 5/288 428/680 |

(Continued)

FOREIGN PATENT DOCUMENTS

| | | |
|---|---|---|
| EP | 1956215 | 8/2008 |
| EP | 2224113 | 9/2010 |
| GB | 2348466 | 10/2000 |

OTHER PUBLICATIONS

The Extended European Search Report for EP Application No. 19167088.4, dated Aug. 2, 2019.

*Primary Examiner* — Arun Goyal
(74) *Attorney, Agent, or Firm* — Carlson, Gaskey & Olds, P.C.

(57) ABSTRACT

A gas turbine engine includes a plurality of rotating components housed within a compressor section and a turbine section. A first tap is connected to the compressor section and configured to deliver air at a first pressure. A heat exchanger is connected downstream of the first tap. A flowpath is defined between a rotating surface and a non-rotating surface. The flowpath is connected downstream of the heat exchanger and is configured to deliver air to at least one of the plurality of rotating components. At least a portion of the non-rotating surface and the rotating surface includes a base metal. An insulation material is disposed on a surface along the flowpath.

12 Claims, 3 Drawing Sheets

(56) References Cited

U.S. PATENT DOCUMENTS

| | | | |
|---|---|---|---|
| 7,416,790 B2* | 8/2008 | Jiang | ........................ C23C 10/52 |
| | | | 428/668 |
| 7,942,117 B2 | 5/2011 | Robinson | |
| 8,056,345 B2 | 11/2011 | Norris et al. | |
| 8,182,205 B2 | 5/2012 | Caruso et al. | |
| 9,850,819 B2 | 12/2017 | Suciu et al. | |
| 9,856,793 B2 | 1/2018 | Zelesky et al. | |
| 9,869,204 B2* | 1/2018 | Winn | .................... F01D 25/145 |
| 10,280,841 B2* | 5/2019 | Spangler | .................... F02C 7/18 |
| 2013/0205790 A1 | 8/2013 | Xu et al. | |
| 2015/0354455 A1 | 12/2015 | Suciu et al. | |
| 2016/0370010 A1 | 12/2016 | Clegg et al. | |
| 2017/0037782 A1 | 2/2017 | Schwarz et al. | |
| 2017/0074171 A1* | 3/2017 | Takenaka | ................ F02C 7/141 |
| 2017/0321605 A1 | 11/2017 | Slavens et al. | |
| 2019/0256983 A1* | 8/2019 | Jou | ........................ B64C 11/205 |
| 2019/0277143 A1* | 9/2019 | Ishiguro | ................. F01D 9/065 |
| 2021/0140340 A1* | 5/2021 | Shiramasa | ................ F01D 9/04 |

* cited by examiner

COOLING AIR FOR GAS TURBINE ENGINE WITH THERMALLY ISOLATED COOLING AIR DELIVERY

CROSS-REFERENCE TO RELATED APPLICATION

This application claims priority to U.S. Provisional Application No. 62/653,647 filed on Apr. 6, 2018.

BACKGROUND

This application relates to the supply of cooled cooling air to various rotating components in a gas turbine engine and wherein a cooling air path is thermally isolated from hotter sections of the gas turbine engine.

Gas turbine engines are known and typically include a fan delivering air into a bypass duct as bypass air and into a compressor in a core engine. The air in the compressor is compressed and delivered into a combustor where it is mixed with fuel and ignited. Products of this combustion pass downstream over turbine rotors driving them to rotate.

As can be appreciated, many of the components in a gas turbine engine see very high temperatures. As an example, the turbine section and, in particular, its early stages see hot products of combustion. In addition, the compressor and, in particular, its downstream most stages also see very high temperatures. This is particularly true as the pressures develop in the compressor sections are increasing.

Thus, it is known to supply cooling air to various rotating components such as in the turbine section and/or compressor section.

SUMMARY

In a featured embodiment, a gas turbine engine includes a plurality of rotating components housed within a compressor section and a turbine section. A first tap is connected to the compressor section and configured to deliver air at a first pressure. A heat exchanger is connected downstream of the first tap. A flowpath is defined between a rotating surface and a non-rotating surface. The flowpath is connected downstream of the heat exchanger and is configured to deliver air to at least one of the plurality of rotating components. At least a portion of the non-rotating surface and the rotating surface includes a base metal. An insulation material is disposed on a surface along the flowpath.

In another embodiment according to the previous embodiment, there is a downstream most location in a high pressure compressor within the compressor section and the first tap is at an upstream location relative to the downstream most location.

In another embodiment according to any of the previous embodiments, there is a high pressure compressor in the compressor section with a downstream most location and the first tap is at a location where air will have passed downstream of the downstream most location.

In another embodiment according to any of the previous embodiments, the at least one rotating component includes at least a downstream most portion of a high pressure compressor within the compressor section.

In another embodiment according to any of the previous embodiments, the at least one rotating component includes an upstream most blade and vane in a high pressure turbine which is part of the turbine section.

In another embodiment according to any of the previous embodiments, the material is provided outwardly of the base metal on at least a portion of both the rotating surface and the non-rotating surface.

In another embodiment according to any of the previous embodiments, there is a combustor radially outward of the non-rotating surface. A chamber is intermediate the combustor and the non-rotating surface is connected to receive compressed air downstream of a downstream most location in the compressor section.

In another embodiment according to any of the previous embodiments, the rotating surface is an outer surface of a shaft connecting a high pressure turbine rotor in the turbine section to a high pressure compressor rotor in the compressor section.

In another embodiment according to any of the previous embodiments, the insulation material on the rotating surface is a coating.

In another embodiment according to any of the previous embodiments, the coating includes an outer ceramic topcoat facing the insulation material on the non-rotating surface.

In another embodiment according to any of the previous embodiments, there is a metallic bond coat intermediate said ceramic topcoat and the underlying base metal in the rotating surface.

In another embodiment according to any of the previous embodiments, there is a thermally-grown oxide coating intermediate the metallic bond coat and the ceramic topcoat.

In another embodiment according to any of the previous embodiments, the insulation material on the non-rotating surface includes a ceramic fiber blanket.

In another embodiment according to any of the previous embodiments, the base metal is radially inward of the ceramic fiber blanket and an outer wall of the non-rotating surface is attached on an opposed radial side of the ceramic fiber blanket relative to the base metal.

In another embodiment according to any of the previous embodiments, the insulation material on the non-rotating component includes a ceramic fiber blanket. The base metal is radially inward of the ceramic fiber blanket and an outer wall of the non-rotating structure is attached on an opposed radial side of the ceramic fiber blanket relative to the base metal.

In another embodiment according to any of the previous embodiments, fluid conduits are connected to a location downstream of the heat exchanger, to communicate air downstream of the heat exchanger into the flow path, and at least some of the fluid conduits being provided with insulation.

In another embodiment according to any of the previous embodiments, the ceramic fiber blanket is formed of bulk fibers.

In another embodiment according to any of the previous embodiments, ceramic fiber blanket is formed with a alumina-silica fibers.

In another embodiment according to any of the previous embodiments, fluid conduits are connected to a location downstream of the heat exchanger, to communicate air downstream of the heat exchanger into the flow path, and at least some of the fluid conduits being provided with insulation.

In another embodiment according to any of the previous embodiments, fluid conduits are connected to a location downstream of the heat exchanger, to communicate air downstream of the heat exchanger into the flow path, and at least some of the fluid conduits being provided with insulation.

These and other features may be best understood from the following drawings and specification.

DETAILED DESCRIPTION

Figure 1:
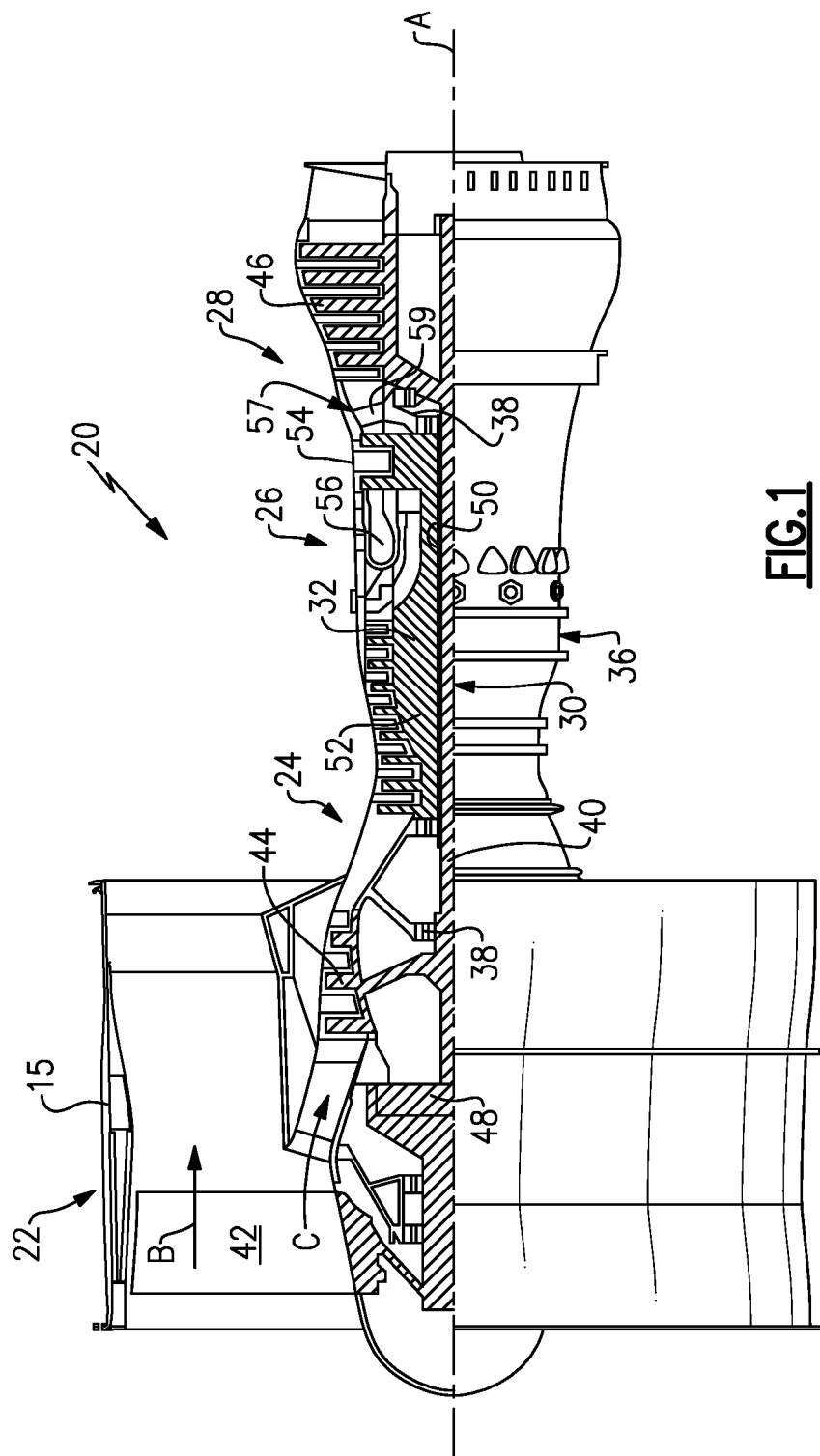
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
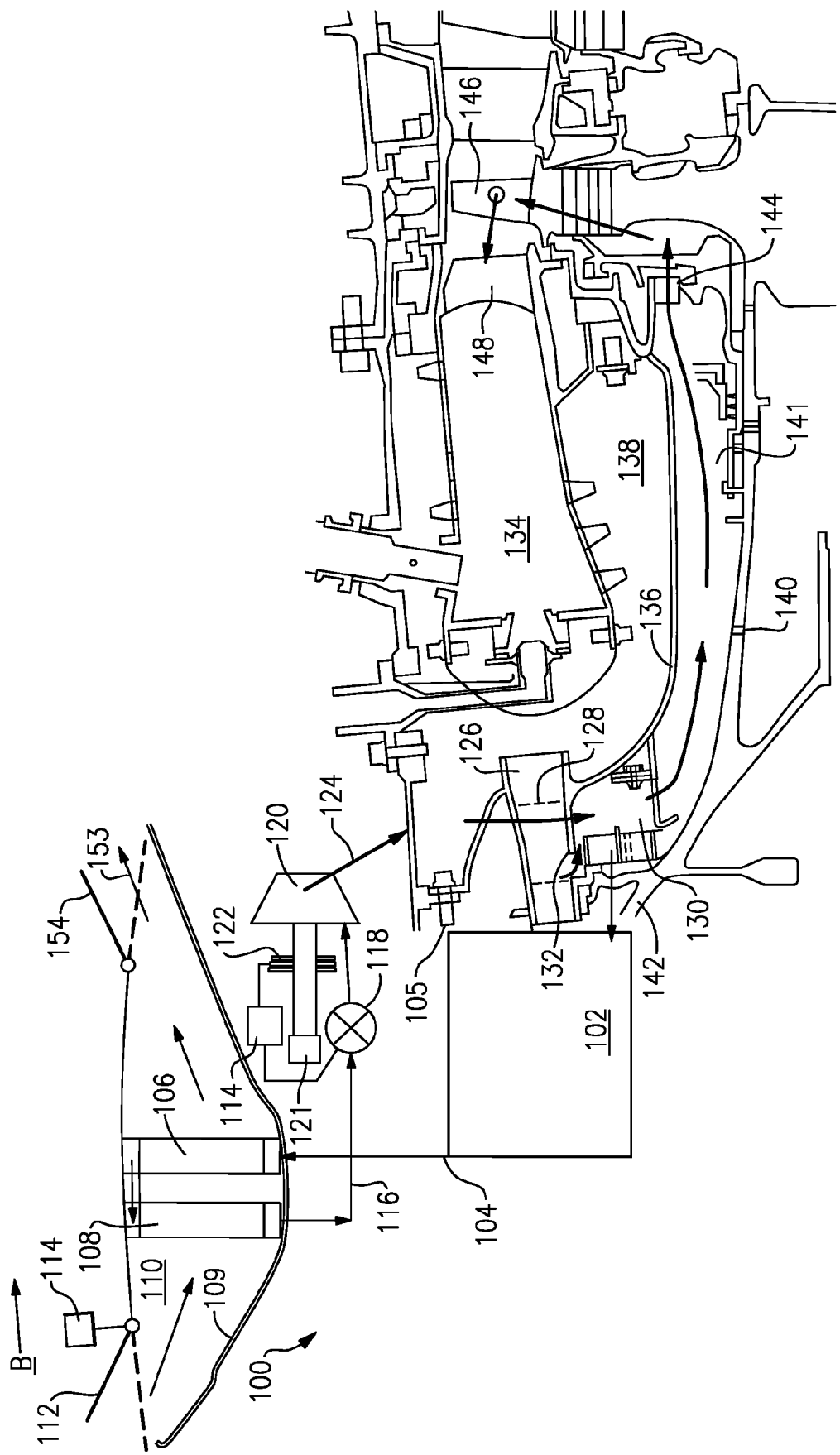
FIG. 2 shows a first cooling air supply system.

FIG. 2 shows an intercooled cooling air system 100. A high pressure compressor 102 is provided with a tap 104 for tapping air to be utilized as cooling air. Note the tap 104 is from an intermediate location in the high pressure compressor. In alternative embodiments, the tap could be from a low pressure compressor.

Stated broadly, the tap in the FIG. 2 embodiment is from a location upstream of a downstream most location 105 in the high pressure compressor 102. The tapped air at line 104 passes through a first leg 106 of a heat exchanger and back into a second leg 108 where it is returned through an inner housing 109. The heat exchanger 106/108 sits in a chamber 110 in this embodiment, which is radially inward of the bypass duct B.

As shown, a valve 112 selectively allows the air from bypass duct B to pass over the heat exchanger 106/108. A control 114 is shown controlling the position of the valve 112. Air at line 116 inward of the housing 109 passes through a shutoff valve 118 into a cooling compressor 120. The cooling compressor 120 is provided with a drive 121.

A system to stop the cooling compressor 120 from compressing is provided. In the illustrated example, the system is a clutch 122 which can disconnect the cooling compressor 120 from its drive 121. Alternatively, the drive 121 could be an electric motor and simply stopped. The control 114 controls the shutoff valve 118 and the clutch 122. It is desirable that the control be programmed such that the compression of air by the cooling compressor 120 is effectively stopped before the valve 118 is shut down to block the flow of air from line 116 reaching the cooling compressor 120.

Downstream of the cooling compressor 120, the air passes into a line 124 and through struts 128 in a diffuser 126 radially into a mixing chamber 130. In this embodiment, high pressure air may be tapped at 132 into the mixing chamber 130. The high pressure air tapped 132 may be air downstream of the downstream most location 105 in the high pressure compressor 102. The air from the mixing chamber 130 is shown passing to cool a disk and rim 142 of a downstream most location in the high pressure compressor 102. The air is also shown passing between a fixed housing 136 and a rotating shaft portion 140, which is part of the high pressure spool as described with regard to FIG. 1. A chamber 141 between the housing 136 and outer periphery of the shaft portion 140 receives the cooling airflow. That air passes through a tangential on-board injector 144 ("TOBI") and then passes to cool the first stage blade 146 and vane 148 of a high pressure turbine. The shaft portion 140 could be thought of as a rotating portion, and the housing portion 136 could be thought of as a non-rotating portion.

As shown, the wall 136 is radially inward of a combustor 134 and a chamber 138 is intermediate to the two.

As known, the chamber 138 receives air downstream of the downstream most location in the high pressure compressor and, thus, is at high temperature. As the air passes to the TOBI 144 and through the chamber 141, it may be heated by those high temperatures, which reduces the efficiency of the overall system.

In embodiments, an insulation feature is placed both on at least a majority of the surface area of the housing 136 between the diffuser 126 and the TOBI 144. An insulation material is also place along the majority of the outer surface of the shaft portion 140 between the downstream most location of the high pressure compressor and the rotation of the first turbine blade 146.

For purposes of this application, each of the housing 136 and shaft 140 are formed of an underlying base metal and an outer insulation material. The outer insulation material has better resistance to heat passage than does the underlying metal. Insulation in a gas turbine, and as may be defined in this application is a non-structural addition to a structure in that there is little or no structural contribution to the additional aspect involved. Further, the insulation in a gas turbine, may prevent fluid from passing on one side of the lower conductivity material which is sometimes referred to as "infiltration." Such fluid passage would dramatically lower the value of the measures take to apply the insulation. And, finally, the insulation may be introduced to the assembly by additionally manufacturing step and processes.

Figure 3:
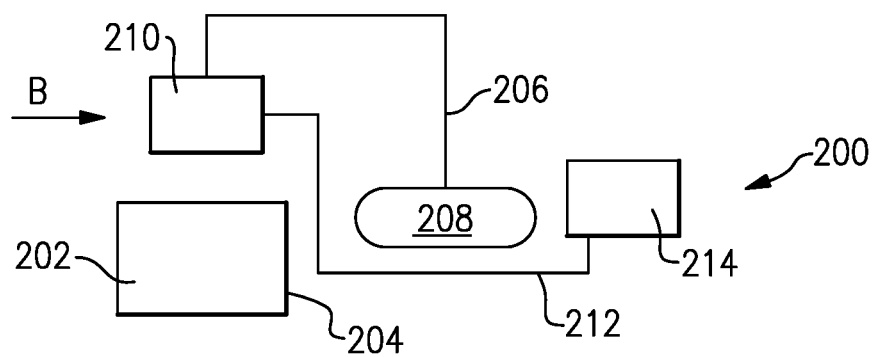
FIG. 3 shows an alternative system.

In an alternative embodiment shown schematically in FIG. 3, the cooling system 200 taps air from a location at or downstream of the downstream most location 204 in the high pressure compressor 202. Here, the air is shown tapped at 206 from a chamber radially outward of the combustor 208. That air passes through a heat exchanger 210, which is shown schematically being cooled, and then returned back inwardly through chamber 212 to the high pressure turbine 214. Such passage of air may also include the wall 136 and shaft 140 as in the FIG. 2 embodiment. Thus, the same temperature challenges are raised.

Figure 4:
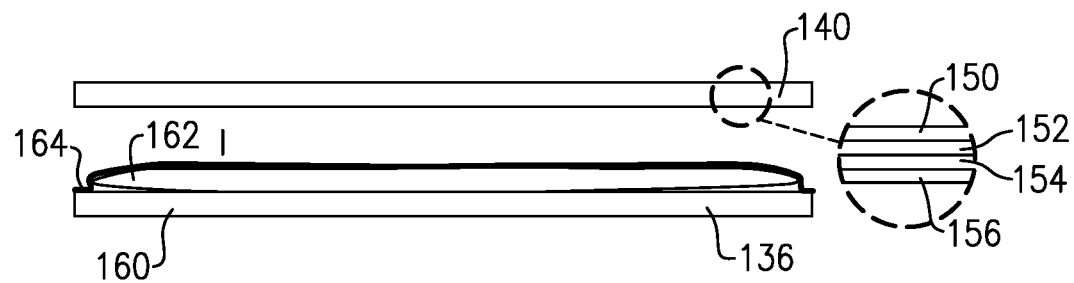
FIG. 4 shows a detail of the FIG. 2 or 3 system.

FIG. 4 shows details of one embodiment of insulation material. The outer surface of the shaft 140, which faces the wall 136, is preferably provided with an insulation coating. Coating is preferred for the rotating structure as the attachment of sheets or other structure which might require mechanical attachment raises challenges with the centrifugal forces that the rotating structure will see. In this embodiment, the underlying base metal 150 is provided with a metallic bond coat 152. A thermally-grown oxide coating 154 is placed outwardly of the bond coat 152. A ceramic topcoat 156 then surrounds the thermally-grown oxide.

In one embodiment, the ceramic topcoat may be composed of Yttria-stabilized zirconia.

An outer surface of the housing 136 includes the metallic base layer 160 and a double wall structure, such as provided by an attached outer wall 164, which faces the rotating shaft surface 140. An intermediate insulation material such as a ceramic fiber blanket 162 is placed between the walls 160 and 164. Such ceramic fiber blankets are known for various applications and may be formed of bulk fibers produced by spinning processes. The blanket 162 may be formed from pure alumina-silica. Further, the blanket 162 may be a continuous blanket and may be mechanically sewn with double needles to provide better integrity to the surface on both sides of the blanket.

In embodiments, the pipes and, particularly, those downstream of the heat exchanger 106/108 (or 210) may also be provided with insulation. This would include connections 116 and, in particular, connection 124.

In addition, monitors are provided to ensure proper operation of valve 112, valve 118, clutch 122, and predetermine any undesirable pressures or temperatures in the conduit 124.

Stated another way, a gas turbine engine include rotatable components including components within a compressor section and a turbine section housed within an outer housing. A tap is connected to tap air that has passed at least partially through the compressor section The tap is connected to pass through a heat exchanger and connected to pass into a flow path between a rotating surface and a non-rotating surface. The flow path is connected to cool at least one of said rotatable components. At least a portion of each of the non-rotating surface and the rotating surface are provided with a base metal, and an insulation material on a surface facing the other of the rotatable and non-rotatable surfaces.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a plurality of rotating components housed within a compressor section and a turbine section;
   a first tap connected to said compressor section and configured to deliver air at a first pressure;
   a heat exchanger connected downstream of said first tap;
   a rotating surface radially outward of a non-rotating surface defining a flowpath therebetween and wherein the non-rotating surface faces the rotating surface, wherein the flowpath is connected downstream of said heat exchanger and is configured to deliver air to at least one of said plurality of rotating components, wherein at least a portion of said non-rotating surface and said rotating surface comprising a base metal;

an insulation material disposed on a surface along the flowpath;

wherein said insulation material being provided outwardly of said base metal on at least a portion of both said rotating surface and said non-rotating surface;

wherein there is a combustor radially outward of said non-rotating surface, and a chamber intermediate said combustor and said non-rotating surface connected to receive compressed air downstream of a downstream most location in said compressor section;

wherein said insulation material on said rotating surface is a coating;

wherein said rotating surface is an outer surface of a shaft connecting a high pressure turbine rotor in said turbine section to a high pressure compressor rotor in said compressor section; and wherein said insulation material on said non-rotating surface includes a ceramic fiber blanket formed of bulk fibers, and wherein said base metal is radially inward of said ceramic fiber blanket and an outer wall of said non-rotating structure is attached on an opposed radial side of said ceramic fiber blanket relative to said base metal.

2. The gas turbine engine as set forth in claim 1, wherein there is a downstream most location in a high pressure compressor within said compressor section and the first tap is at an upstream location relative to the downstream most location.

3. The gas turbine engine as set forth in claim 1, wherein there is a high pressure compressor in the compressor section with a downstream most location and said first tap is at a location where air will have passed downstream of the downstream most location.

4. The gas turbine engine as set forth in claim 1, wherein said at least one rotating component includes at least a downstream most portion of a high pressure compressor within the compressor section.

5. The gas turbine engine as set forth in claim 1, wherein said at least one rotating component includes at least an upstream most blade and vane in a high pressure turbine which is part of said turbine section.

6. The gas turbine engine as set forth in claim 5, wherein said coating including an outer ceramic topcoat facing the insulation material on said non-rotating surface.

7. The gas turbine engine as set forth in claim 6, wherein there is a metallic bond coat intermediate said ceramic topcoat and the underlying base metal in said rotating surface.

8. The gas turbine engine as set forth in claim 7, wherein there is a thermally-grown oxide coating intermediate said metallic bond coat and said ceramic topcoat.

9. The gas turbine engine as set forth in claim 5, wherein fluid conduits are connected to a location downstream of said heat exchanger, to communicate air downstream of the heat exchanger into said flow path, and at least some of said fluid conduits being provided with insulation.

10. The gas turbine engine as set forth in claim 5, wherein said ceramic fiber blanket is formed with a alumina-silica fibers.

11. The gas turbine engine as set forth in claim 10, wherein fluid conduits are connected to a location downstream of said heat exchanger, to communicate air downstream of the heat exchanger into said flow path, and at least some of said fluid conduits being provided with insulation.

12. The gas turbine engine as set forth in claim 5, wherein fluid conduits are connected to a location downstream of said heat exchanger, to communicate air downstream of the heat exchanger into said flow path, and at least some of said fluid conduits being provided with insulation.

* * * * *